(12) United States Patent
Noldus et al.

(10) Patent No.: US 7,881,288 B2
(45) Date of Patent: Feb. 1, 2011

(54) ROUTING MEDIA STREAMS FROM PACKET SWITCHED NETWORK TO CIRCUIT SWITCHED NETWORK

(75) Inventors: Rogier Noldus, Goirle (NL); Jos den Hartog, Capelle a/d Ijssel (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/161,708

(22) PCT Filed: Feb. 1, 2006

(86) PCT No.: PCT/EP2006/050600

§ 371 (c)(1),
(2), (4) Date: Nov. 18, 2009

(87) PCT Pub. No.: WO2007/087898

PCT Pub. Date: Aug. 9, 2007

(65) Prior Publication Data

US 2010/0220667 A1    Sep. 2, 2010

(51) Int. Cl.
*H04L 12/66* (2006.01)
*H04L 12/28* (2006.01)
*H04L 12/56* (2006.01)

(52) U.S. Cl. .............. 370/354; 370/353; 370/355; 370/389; 370/395.54

(58) Field of Classification Search ......... 370/352–356, 370/389, 395.5, 395.54
See application file for complete search history.

(56) References Cited

U.S. PATENT DOCUMENTS

| | | | |
|---|---|---|---|
| 6,771,983 B1 * | 8/2004 | Turina et al. ............. | 455/560 |
| 2002/0024943 A1 | 2/2002 | Karaul et al. | |
| 2002/0075846 A1 | 6/2002 | Valentine et al. | |

* cited by examiner

*Primary Examiner*—Ronald Abelson (57) ABSTRACT

A method, apparatus and computer program in a telecommunication network (111, 112, 121) for routing a media stream from an IMS domain to an MSC (107, 107a) associated with a mobile station in a circuit switched domain of a PLMN (109), wherein a service control node (111, 112, 121) receives a first request for routing path data for routing said media stream to a logical address associated with said mobile station (110), and wherein said logical address is converted into a physical address of the mobile station (110) and subsequently converted into a physical address of the MSC (107, 107a). A service control node (111, 112, 121) in the IMS domain obtains the MSRN for the mobile station (110). The MSRN is used to route the call as an IMS call right up to the MSC (107, 107a). The service control node (111, 112, 121) may comprise a SIP-AS, an ENUM server or a Client Gateway.

19 Claims, 10 Drawing Sheets

*Fig. 1*

*(Prior Art)*

*Fig. 2*

*(Prior Art)*

ROUTING MEDIA STREAMS FROM PACKET SWITCHED NETWORK TO CIRCUIT SWITCHED NETWORK

TECHNICAL FIELD

The invention relates to telecommunication systems and, more particularly, to a method, system and devices for routing media streams from a packet switched network to a circuit switched network.

BACKGROUND

A telephony operator may operate both a mobile network such as a Global System for Mobile communications (GSM) or a Universal Mobile Telecommunications System (UMTS) network on the one hand and a fixed line network such as Public Switched Telephone Network (PSTN) and Integrated Services Digital Network (ISDN) on the other hand.

The central component of the Core Network subsystem of a GSM network is the Mobile services Switching Center (MSC). It acts like a switching node of the PSTN or ISDN, and additionally provides functionality needed to handle a mobile subscriber, such as registration, authentication, location updating, handover, and call routing to a roaming subscriber. These services are provided in conjunction with several functional entities, which together form the Core Network subsystem. A Gateway MSC (GMSC) provides the connection to the fixed networks. Signaling between functional entities in the Core Network subsystem uses Signaling System Number 7 (SS7), used for trunk signaling in ISDN and widely used in current public networks.

The Home Location Register (HLR) together with the MSC, provide the call-routing and roaming capabilities of GSM. The HLR contains administrative information of each subscriber registered in the GSM network. The HLR also contains the physical address of the MSC/VLR where the mobile station is currently registered. The location of the mobile station is typically in the form of the signaling address of the VLR associated with the mobile station. The VLR contains selected administrative information from the HLR, necessary for call control and provision of the subscribed services, for each mobile station currently located in the geographical area controlled by the VLR and currently served by that VLR. Although each functional entity can be implemented as an independent unit, currently all manufacturers of switching equipment implement the VLR together with the MSC, so that the geographical area controlled by the MSC corresponds to that controlled by the VLR, thus simplifying the signaling required.

The administrative information of each subscriber comprises amongst others the International Mobile Subscriber Identity (IMSI), which is an internal subscriber identity used by the network, and a Mobile Station ISDN (MSISDN) number, which is the telephone number associated with the phone user.

There is logically one HLR per GSM network, although it may be implemented as a distributed database.

When a subscriber places a call to a mobile phone in the GSM network, he dials the MSISDN number, and the call is routed to the mobile phone operator's GMSC. A gateway is a node used to interconnect two networks. The gateway is often implemented in an MSC, in which case the MSC is referred to as the GMSC. The GMSC acts as the "entrance" from exterior portions of the Public Switched Telephone Network onto the provider's network.

As noted above, the phone user is free to roam anywhere in the operator's network or on the networks of roaming partners, including in other countries. The GMSC determines the MSC/VLR to which the mobile phone is registered in order to connect the call. It does this by consulting the HLR. The HLR relays a so called Mobile Station Roaming Number (MSRN) to the GMSC, which uses it to route the call to a Visited MSC (VMSC). The above described network architecture is both applicable to GSM networks, which are referred to as second generation (2G) mobile systems, and third generation (3G) mobile systems, which will follow up the 2G systems.

UMTS is one of these 3G mobile phone technologies. It uses Wideband Code Division Multiple Access(W-CDMA) as the underlying standard. UMTS is standardized by the 3GPP (3rd Generation Partnership Project), and represents the European/Japanese answer to the ITU IMT-2000 requirements for 3G mobile systems.

Currently, most fixed line networks and mobile networks use Circuit Switched (CS) technology for the media transport. There is, however, a gradual shift from CS based telecommunications networks to Packet Switched (PS) based telecommunications networks. PS based networks may use e.g. the Internet Protocol (IP) as protocol for signaling between network entities and for the transport of multimedia streams.

The IP Multimedia Subsystem (IMS) is a standardized networking architecture for telecommunication operators that want to provide mobile and fixed multimedia services. It uses a Voice-over-IP (VoIP) implementation based on a 3GPP standardized implementation of Session Initiation Protocol (SIP), and runs over the standard Internet Protocol (IP).

SIP is an application-layer control (signaling) protocol for creating, modifying, and terminating sessions with one or more participants. These sessions include e.g. voice calls, multimedia sessions, and multimedia conferences. SIP invitations (SIP INVITES) are used to create sessions carry session descriptions that allow participants to agree on a set of compatible media types. SIP makes use of elements called proxy servers to help route requests to the user's current location, authenticate and authorize users for services, implement provider call-routing policies, and provide features to users. SIP also provides a registration function that allows users to upload their current locations for use by proxy servers. SIP runs on top of several different transport protocols.

IMS provides for a new telecommunication service delivery platform for operation with the Internet. With IMS, users have to be able to execute all their services from their home networks as well as when roaming from their home network to a visited network. To achieve these goals, IMS is based on standard IP protocols as defined by the IETF. So, a multimedia session between two IMS users, between an IMS user and a user on the Internet, and between two users on the Internet is established using the same protocol. Moreover, the interfaces for service developers are also based on IP protocols. Existing phone systems (both PS and CS) are supported by IMS and IMS may be applied in fixed networks and in mobile networks. Therefore IMS merges the Internet with the cellular world; it uses cellular technologies to provide ubiquitous access and Internet technologies to provide appealing services.

An operator that owns both a fixed line network and a mobile network may migrate the fixed line network from CS technology to IMS, prior to migrating the mobile network from CS technology to IMS. This trend, whereby IMS will be more widespread in fixed line networks than in mobile networks, is due to the fact that mobile networks typically do not have sufficient capacity in the Radio Access Network (RAN) to handle IMS for speech calls. Insufficient capacity may comprise too high latency or too low bandwidth. Hence, IMS will experience a slower take-up in the mobile network than in the fixed line network.

Such operator that operates both a fixed line network, needs efficient mechanisms to route calls between the fixed line network and the mobile network. The operator may offer services like Virtual Private Network (VPN), where subscribers have a fixed line connection. Within the context of VPN, calls need to be routed to e.g. from the fixed network to the mobile network. A fixed line connection may be through an ISDN/PSTN connection or a Private Branch eXchange. A Private Brach eXchange (also called PABX, PBX) is a telephone exchange that is owned by a private business, as opposed to one owned by a common carrier or by a telephone company.

Figure 1:
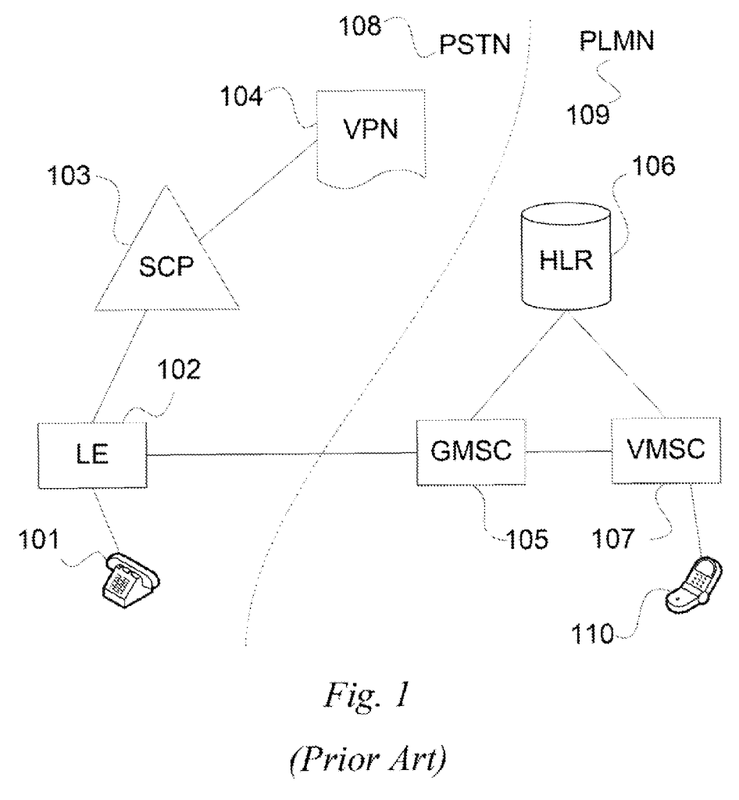
FIG. 1 is a diagram showing an architecture for call routing between a fixed line network and a mobile network.

FIG. 1 gives a graphical representation of call routing between the fixed line network and the mobile network. A fixed line call, initiated from within the PSTN, may need to be routed to the PLMN, under the control of the operator's VPN service. When the call is routed to the PLMN, the call is handled by the GMSC and the HLR according to the standard GSM/UMTS call handling process. The call is routed to the VMSC where the destination subscriber is currently registered. The call setup between Local Exchange (LE), GMSC and VMSC is done using ISDN User Part (ISUP). ISUP is part of the Signaling System #7 (SS7) which is used to set up telephone calls in PSTN. The Bearer Independent Call Control (BICC, "layered architecture") may be used instead of ISUP. When such operator has migrated the fixed line network to IMS, but not yet the mobile network, that operator still requires efficient mechanisms to route calls from IMS in the PSTN to PLMN. In such scenario, the call control and the media transport in the fixed line network are both based on IP. When the call is routed from PSTN to PLMN, the IP signaling and media transport is converted to the signaling and transport protocols used in the PLMN. This may be, as in the earlier example, ISUP/BICC and Time Division Multiplex (TDM) respectively.

Figure 2:
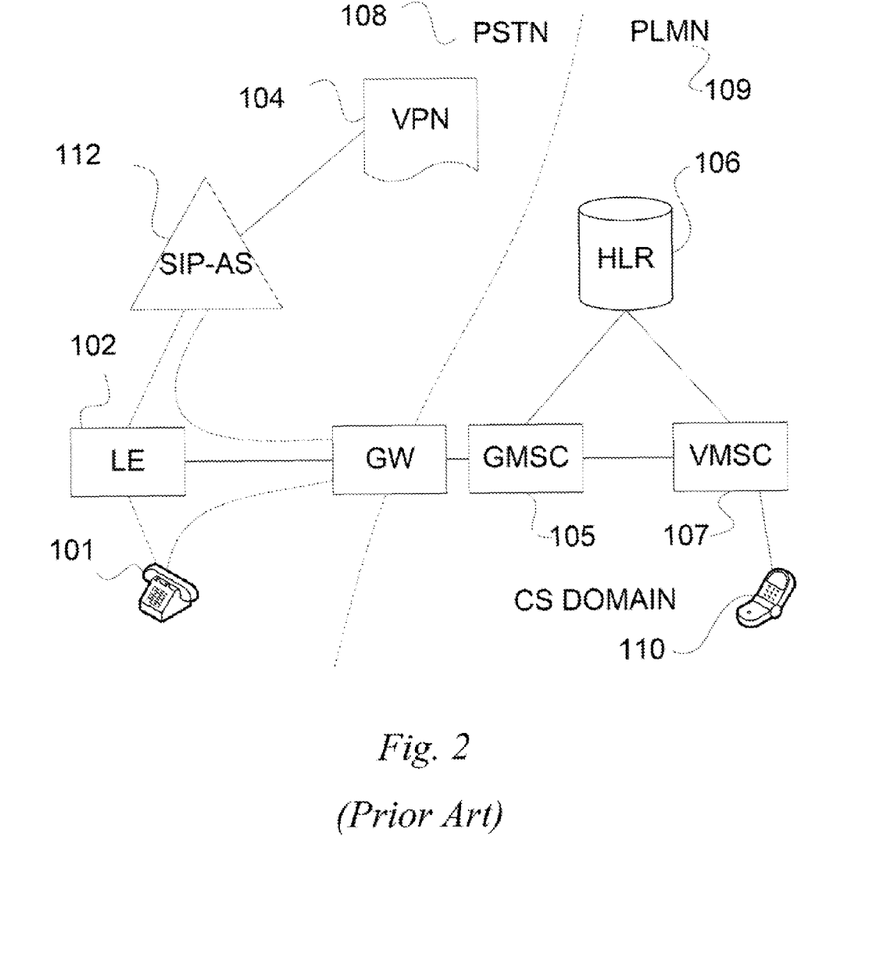
FIG. 2 is a diagram showing an architecture for call routing from an IP domain to a CS domain as previously described.

FIG. 2 depicts a possible architecture for above-described scenario of Routing from an IP domain to a CS domain. The media stream of the call in the (fixed line) IP network is transported over Real-time Transport Protocol (RTP), whereas the signaling is handled by SIP. RTP provides end-to-end network transport functions suitable for applications transmitting real-time data, such as audio, video or simulation data, over multicast or unicast network services. RTP is independent of the underlying transport and network layers. The IMS related entities between the IMS terminal and the SIP Application Server (AS), such as Serving Call Session Control Function (S-CSCF), are not depicted in FIG. 2.

To route the call to the PLMN, a border Gateway is needed: the SIP signaling needs to be converted to ISUP and the RTP media stream needs to be converted to TDM. After conversion of the respective protocols, the call can be forwarded to the GMSC in the PLMN and from there to the VMSC.

In the following a current method is described for call routing via GMSC in PLMN. The MSISDN of the destination subscriber identifies that subscriber, but does not reveal her location. For that reason, the IMS network routes the call to that MSISDN using a Breakout Gateway Control Function (BGCF). The BGCF may be a default BGCF. The BGCF is located in the IMS network. The BGCF forwards the call to a GMSC in the GSM network of the destination subscriber. The GMSC takes care of routing the call further; this includes, amongst others, obtaining a Mobile Station Roaming Number (MSRN) from HLR, and routing the call to the appropriate MSC. The routing of the call from GMSC to VMSC is done with ISUP or BICC (for signaling) and TDM (or other protocol) for media stream.

A current development is the support of SIP in (G)MSC, for the purpose of routing calls in the PLMN for connecting to other networks.

In UMTS networks the MSC server controls all calls from a PSTN/ISDN/GSM network. The MSC server only takes care of the call control and service part, while the switch is replaced with a Media Gateway (MG). The MGs have different tasks depending on where they are placed in the network. The MG at the UMTS terrestrial radio access network (UTRAN) side transforms e.g. VoIP packets into radio frames and the MG at the PSTN side translates all calls coming from PSTN into VoIP calls for transport in a UMTS core network. The control of the MGs is managed by the Media Gateway Control Function (MGCF). The MGCF also performs translation at the call control signaling level between ISUP signaling, used in the PSTN and SIP signaling used in the UMTS multimedia domain. The Call State Control Function (CSCF) is a SIP server that provides/controls multimedia services for IMS mobile stations. The Signaling Gateway (SGW) just relays all the call-related signaling between UTRAN and PSTN on an IP bearer and sends the signaling data to the MGCF.

A prior art patent application WO 01/22766 describes a method for routing a call originated by a PSTN phone (PSTN) to a mobile station (MS) disposed in an integrated telecommunications network with a packet switched network (PSN) portion and a wireless circuit switched network (SN) portion including a location server (LS) containing mapping information between number information and Internet Protocol (IP) address information.

SUMMARY

The present invention proposes further optimization of call-routing in a telecommunication network between an IMS based network and a mobile CS-based network with a limited number of network components. When a call needs to be established to a destination subscriber in the GSM network, the IMS network extends the SIP signaling and the RTP-based media transport right up to the MSC where the destination subscriber is currently registered.

In a first aspect of the invention a method is proposed in a telecommunication network for routing by a service control node a media stream from an IMS domain to a MSC 107 associated with a mobile station 110 in a circuit switched domain of a PLMN 109, wherein the mobile station is identified by a logical address, characterized in that the method comprises the steps of:

said service control node 111, 112, 121 sending a first request for a physical address associated with said mobile station to a HLR 106 associated with said PLMN 109;

said HLR 106 sending a second request for said physical address to said MSC 107;

said MSC 107 sending said physical address to said HLR 106;

said HLR 106 sending said physical address to said service control node 111,112,121;

said service control node 111,112,121 sending said physical address to a traffic control node 119 in said IMS domain;

said traffic control node 111,112,121 sending a request for routing path data associated with said physical address to a routing server 122;

said routing server 122 sending said routing path data to said traffic control entity;

said traffic control node using said routing path data for routing said media stream to said MSC 107.

Main advantage of the invention is that an operator that operates an IMS fixed network and a GSM network, can route calls from IMS to GSM in a very efficient and cost effective manner. A global operator may route calls between terminals in IMS networks, which terminal may be IP-PBX terminals or IP-Centrex terminals, and GSM terminals in one of its PLMNs 109. The entire call routing and media stream may be based on IP signaling.

The invention may be used in cases whereby the IMS network and the GSM network are located in different countries. The IMS network and GSM network do not need to be operated by the same operator.

The call from IMS to Mobile Station 110 passes fewer network nodes; the call bypasses e.g. the GMSC. This may result in reduced network load and reduced call set up time.

In the following further aspects and embodiments of the invention are described. The service control node 111,112,121 may for optionally include in said first request a service suppression indicator such as a suppress Terminating—CAMEL Subscription Information. This provides for the MAP SRI containing special Global Title Translation Type to bypass MNP Signaling Relay Function. The first request may comprise a Mobile Application Part Send Routing Information message. The second request may be a Mobile Application Part Provide Roaming Number (MAP PRN) message.

The service control node may be a SIP-AS, a telephone number mapping server such as an ENUM server 121 or a Client Gateway 111. The traffic control node 119 may be an S-CSCF. The service control node 111,112,121 and traffic control node 119 may also be integrated in the client gateway. The routing server 122 may be a Domain Name Server. The logical address may be a Mobile Station ISDN number; a TEL Uniform Resource Locator (URL) or a SIP Uniform Resource Identifier (URI). The physical address may be a Mobile Station Roaming Number. The routing path data may be an IP address of said MSC. The routing server may send said routing path data after obtaining said routing path data from internal data structure such as internal DNS data provisioning. Alternatively the routing server 122 may send said routing path data after obtaining said routing path data from external data structure such as global DNS data provisioning. This description elaborates on the fact that the IP Address of the MSC 107, 107a may be located anywhere in global DNS structure. The MSC (107, 107a) may be a Visited MSC (107a). MSC (107, 107a) may comprise an MSC server and a combination of a Media Gateway Control Function and a Signaling Gateway (115).

The media stream may be routed through an IP connection using an Internet Protocol standard such as a Real time Transport Protocol. The media stream itself may comprise voice, video or data.

In a second aspect of the invention a S-CSCF (S-CSCF) 119 in a telecommunication network is proposed, which is arranged for routing by a service control node a media stream from an IMS domain to a MSC 107 associated with a mobile station 110 in a circuit switched domain of a PLMN 109, wherein the mobile station is identified by a logical address, wherein the S-CSCF is arranged for sending a logical address of said mobile station to a service control node, characterized in that S-CSCF is further arranged for routing said multimedia stream to said MSC at said physical address by using the method of the invention.

In a third aspect of the invention a service control node 111,112,121 in a telecommunication network is proposed, which is arranged for routing a media stream from an IMS domain to a MSC 107 associated with a mobile station 110 in a circuit switched domain of a PLMN 109, wherein the mobile station is identified by a logical address, characterized in that said service control node comprises:

an input unit 131 arranged for receiving said logical address;

a processor unit 141 arranged for composing a request for a physical address associated with said identified mobile station 110;

an output section 132 arranged for sending said request to a HLR 106 associated with said PLMN (109);

an input section 133 arranged for receiving said physical address from said HLR (106);

a processor unit 141 further arranged for processing said physical address;

an output section 134 arranged for sending said physical address to a traffic control node 119 in said IMS domain.

The service control node 111,112,121 may be a SIP-AS 112 arranged for executing services for said mobile station. The control node 111,112,121 may be a telephone number mapping server such as an ENUM server 121.

In a fourth aspect of the invention a computer program is proposed comprising program instructions for causing a computer to perform the method of the invention. The computer program may be comprised on a carrier and comprising computer executable instructions for causing a computer to perform the method of the invention. The carrier may be a record medium, computer memory, read-only memory or an electrical carrier signal.

The concept of the present invention entails that the SIP-AS 112 in the IMS network takes care of routing the call directly to the destination MSC in the PLMN 109, using IP-based signaling and transport up to the MSC. The destination subscriber to whom the call needs to be established, is identified by her MSISDN.

BRIEF DESCRIPTION OF THE DRAWINGS

FIGS. 1 and 2 show prior art.

FIGS. 3 to 9 show the invention.

DETAILED DESCRIPTION

The invention will now be described with reference to the figures. In the drawings, like or similar elements are designated with identical reference numerals throughout the several views. The depicted lines between the elements represent connections between these elements. The arrows represent connections wherein a direction of a message from one element to another element is shown. The term connection refers to a functional connection and not necessary to a physical connection.

Figure 3:
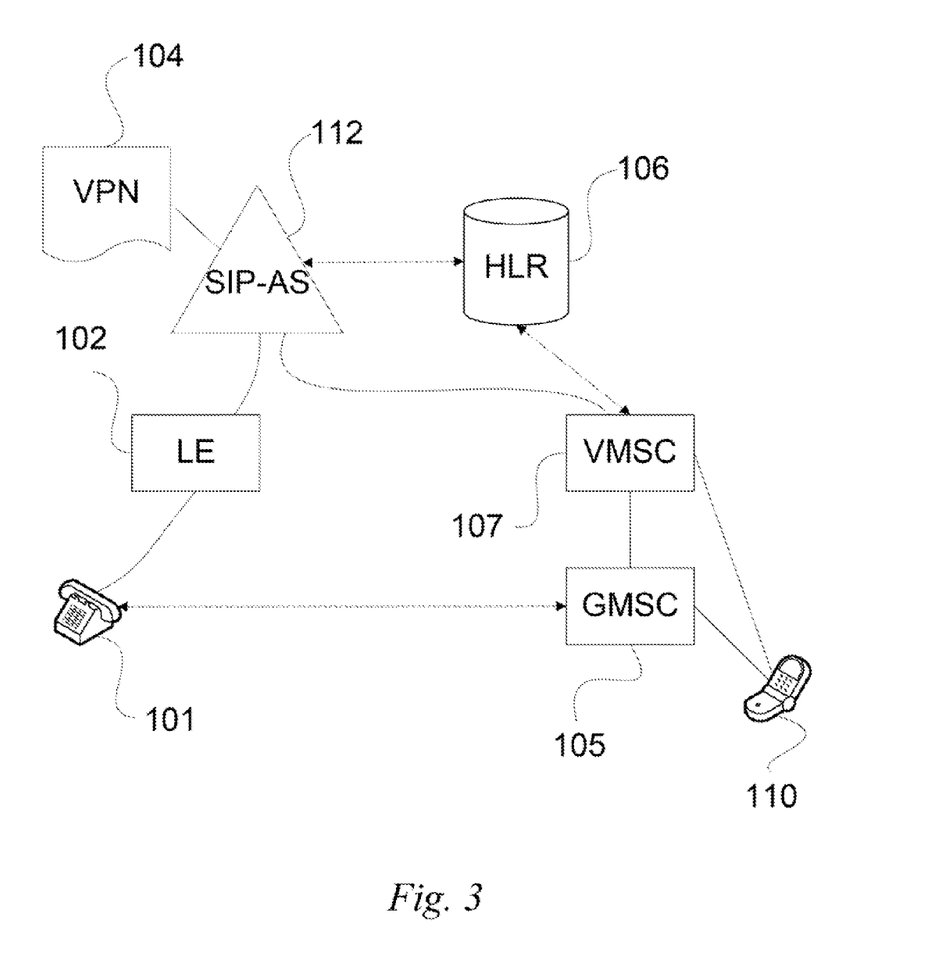
FIG. 3 is a diagram showing direct call routing between IMS terminal 101 and GSM terminal.

FIG. 3 is a diagram showing direct routing between IMS terminal 101 and destination Mobile Station (MS) 110. The VMSC 107a is the combined MSC server 107+MGCF/SGW 115. Hereinafter VMSC may also be referred to as MSC or destination MSC or MSC (B), which all refer to an MSC associated to a Mobile Station of the B-Party (called party) in the Circuit switched domain to which a media stream has to be routed. The MGW 118 is the combined IMS-MGW 114 and CS-MGW 116,117.

A SIP-AS 112 in IMS that is responsible for handling the IMS call for a called party interrogates the HLR 106 of the destination subscriber. The SIP-AS 112 may obtain a MSRN in this way. The MSRN identifies, amongst others, the address of the MSC 107 where the destination subscriber is currently registered. The SIP-AS 112 may then establish an IMS session with that MSC 107, provided that the MSC 107 has an IP address. The SIP session does not need to be established by the GMSC 105; the IMS call is routed from IMS domain directly to the appropriate MSC 107.

The VPN 104 application (as example) in the SIP-AS 112 will ensure that the media stream, transported via RTP, is tunneled directly from the terminal of the calling (IMS) subscriber to the MSC of the destination subscriber. This is accomplished by means of exchange of IP Addresses of the calling subscriber and the MSC 107. The destination MSC 107 contains a MGCF and SGW together forming MGCF/SGW 115. The MGCF/SGW 115 takes care of conversion between SIP and ISUP. The MSC 107 then offers the call to the destination subscriber via Direct Transfer Application Part (DTAP).

The media for this call, i.e. the RTP-based speech, is routed through an IP connection to the combined Media Gateway (MGW) 118 of IMS and CS. This combined MGW 118 is controlled by the MSC 107.

Figure 4:
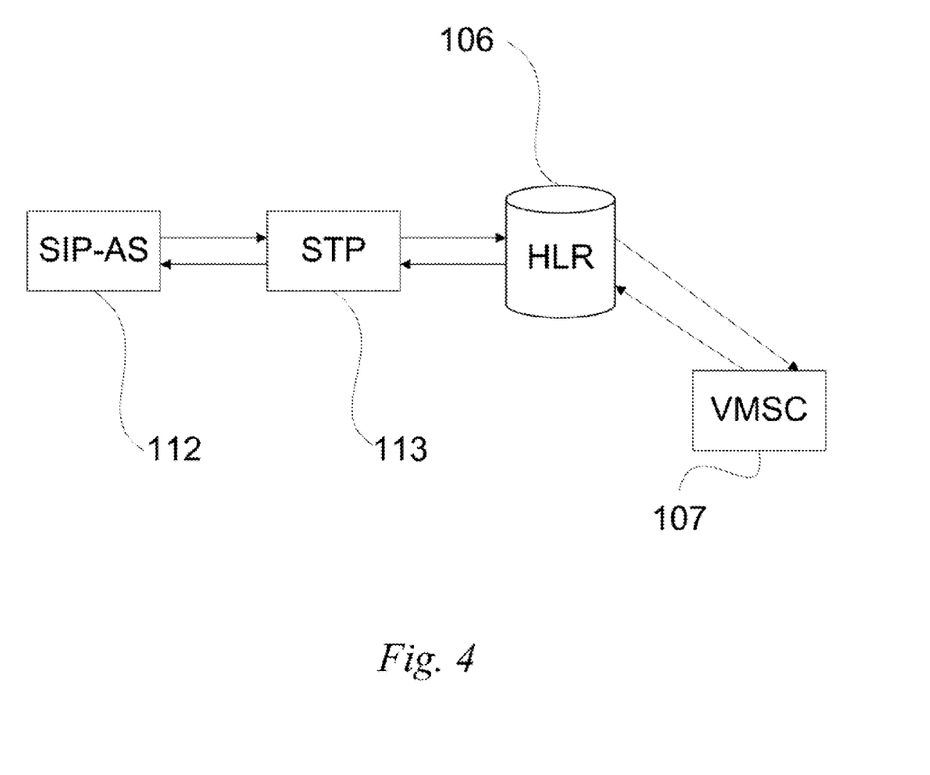
FIG. 4 is a diagram showing how a MSRN is obtained.

FIG. 4 is a diagram showing how the MSRN is obtained. The VPN 104 service (as an example) in the SIP-AS 112 that is controlling the call that is established by the A-party (IMS subscriber) ascertains that the destination subscriber is a subscriber of the PLMN 109 controlled by the same operator. The SIP-AS 112 and the HLR 106 are operated by the same operator; hence, the SIP-AS 112 is entitled to interrogate the HLR 106. The SIP-AS 112 sends the MAP message Send Routing Information (SRI) to the HLR 106.

The SIP-AS 112 uses the MSISDN of the destination subscriber as Global Title (GT) to route a Mobile Application Part Send Routing Information (MAP SRI) message to HLR 106. A Signaling Transfer Point (STP) 113 in the GSM network takes care of translating the GT into the Signaling Point Code (SPC) of the HLR 106 associated with this subscriber. The HLR 106 will, in accordance with standard GSM methodology, send MAP Provide Roaming Number (PRN) to the MSC 107 where the subscriber is currently registered. The MSC 107 allocates the MSRN and returns this to the HLR 106, which forwards the MSRN to the SIP-AS 112.

The GSM operator may operate a Mobile Number Portability Signaling Relay Function (MNP SRF). The MAP SRI will in that case pass through the MNP SRF. If the destination subscriber is ported to another operator, then the MAP SRI will be forwarded to the GSM network that that subscriber now belongs to. Other MNP implementations are also possible.

Figure 5:
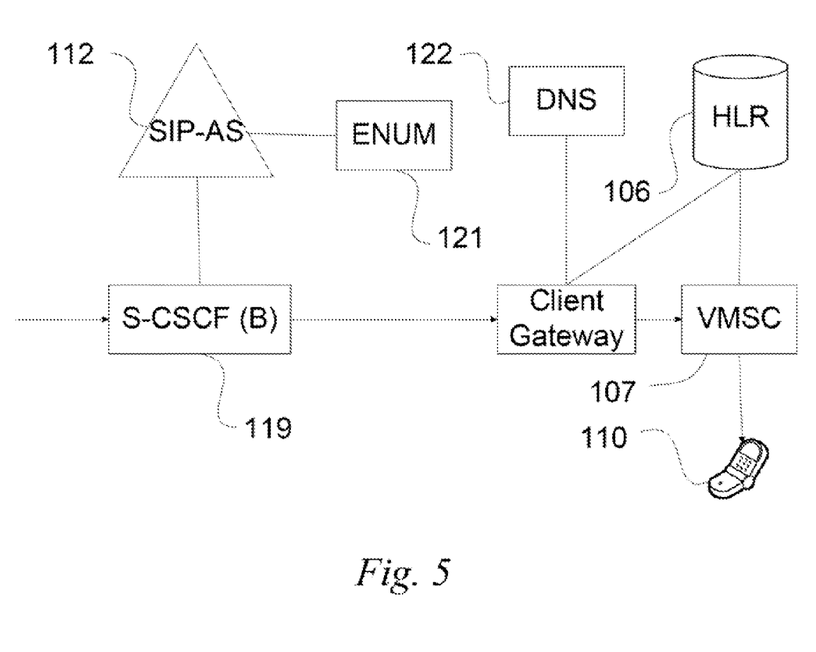
FIG. 5 is a diagram with an embodiment of the invention.

FIG. 5 describes the invention in a preferred embodiment. A SIP-AS 112 sends a first request for a physical address associated with said mobile station to a HLR 106 associated with the PLMN 109 of the called mobile station 110. The HLR 106 sends a second request for said physical address to the VMSC 107a associated to the mobile station 110. The VMSC 107a sends said physical address to said HLR 106. The HLR 106 sends said physical address to said SIP-AS 112. The SIP-AS 112 sends said physical address to a S-CSCF 119 in said IMS domain. The SIP-AS 112 sends a request for routing path data associated with said physical address to a DNS 122. DNS 122 sends said routing path data to said S-CSCF 119. The S-CSCF 119 uses said routing path data for routing said media stream to said VMSC 107a.

Figure 5A:
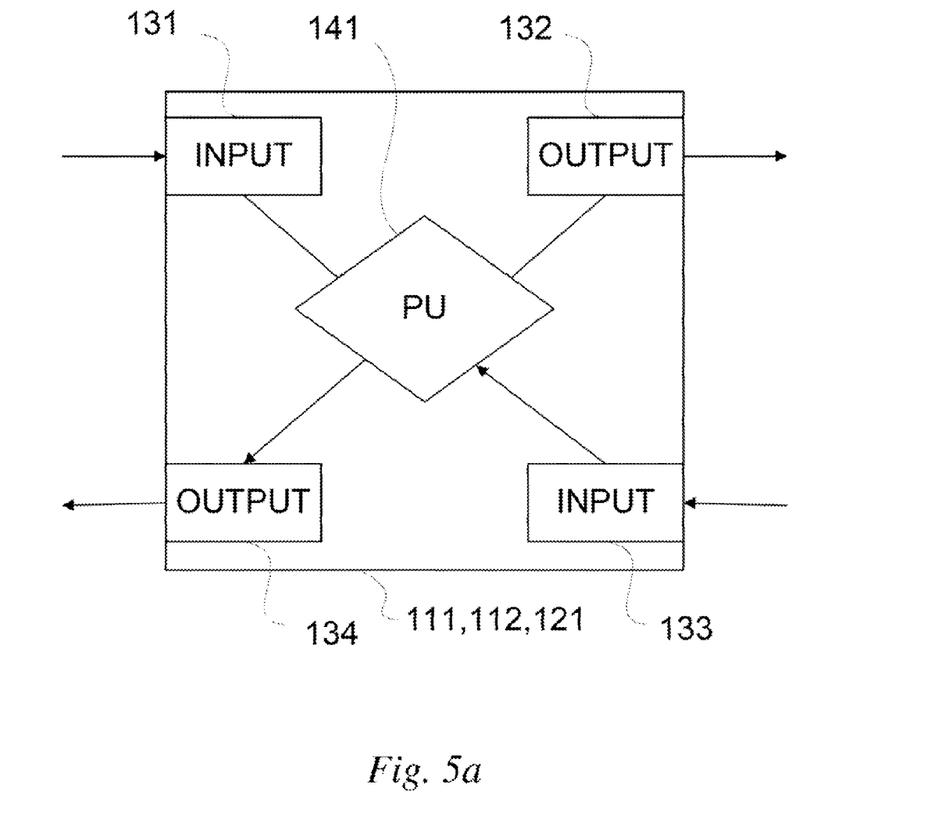
FIG. 5a is a diagram showing a device according to the invention.

FIG. 5a shows a service control node 111,112,121 according to the invention. The service control node 111,112,121 is arranged for routing a media stream from an IMS domain to an MSC 107, 107a associated with a mobile station 110 in a circuit switched domain of a PLMN 109, wherein the mobile station is identified by a logical address. An input unit 131 is arranged for receiving said logical address. A processor unit 141 is arranged for composing a request for a physical address associated with said identified mobile station (110). An output section 132 is arranged for sending said request to a HLR 106 associated with said PLMN 109. An input section 133 is arranged for receiving said physical address from said HLR 106. The processor unit 141 is also arranged for processing said physical address. An output section 134 is arranged for sending said physical address to a traffic control node 119 in said IMS domain.

Figure 6:
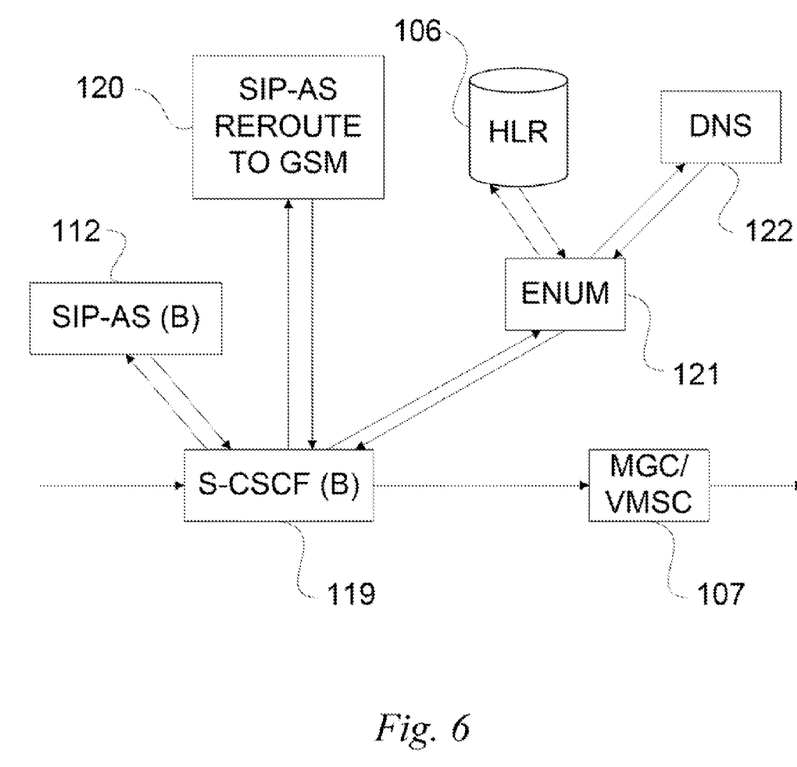
FIG. 6 is a diagram showing an S-CSCF (B) 119 invoking IMS-services for a B-party

FIG. 6 shows an embodiment according to two basic principles of the invention, which comprise:
(1) obtaining MSRN from within the IMS domain, for the purpose of routing a call to a Mobile Station (110).
(2) obtaining an IP Address of the destination VMSC 107a where the GSM call shall be delivered.

The following steps are proposed according to these two principles:
An S-CSCF (B) 119 invokes IMS-services for B-party
After "normal" service execution, the latest SIP-AS 112, which is a locate service, re-routes to tel-URI(B), the GSM-phone
The ENUM 121 translates (using HLR 106) the 06-xxx number into the MSRN
The DNS 122 determines the address of the VMSC 107a node where the call must be routed to.
The IFC of the B-party may contain a setting that indicates to S-CSCF that it shall place a Prefix in front of the TEL URI prior to performing ENUM query. The result will be the same, the difference in the method to obtain the result being, that there is no dedicated SIP-AS (route) 120 required. The task currently performed by SIP-AS (route) 120 will be performed by S-CSCF.

Figure 7:
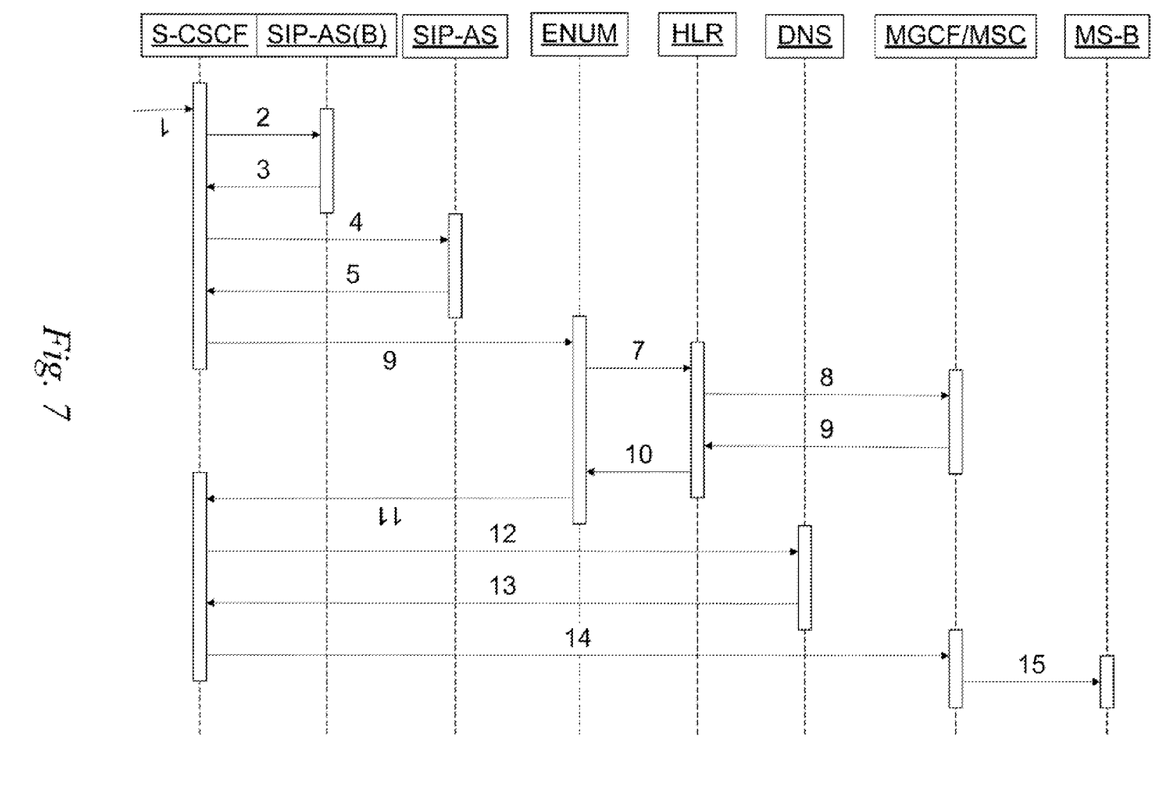
FIG. 7 is a signaling sequence diagram of an embodiment of the method.

FIG. 7 shows a signal sequence diagram for other call cases than described in FIG. 6. The diagram of FIG. 8 comprises the following steps, in which the two above mentioned basic principles are shown:
(1) obtaining MSRN from within the IMS domain, for the purpose of routing a call to a Mobile Station (110) as depicted in steps 6 to 11.
(2) obtaining an IP Address of the destination VMSC 107a where the GSM call shall be delivered as depicted in steps 12 to 13

Step 1 S-CSCF (B) 119 receives a SIP Invite destined for subscriber B. the SIP Invite may originate from an arbitrary source, including, but not limited to: IMS, PLMN 109, PSTN 108. Also, the B-party may be identified by various means, such as TEL URI (e.g. a MSISDN) or a SIP URI (e.g. john.smith@ericsson.com).

Step 2 The B-party is an IMS subscriber and is registered in S-CSCF (B) 119. S-CSCF (B) 119 has Initial Filter Criteria (IFC) for the B-party. IFC is used to invoked an IMS service in SIP-AS(B) 112.

Step 3 SIP-AS(B) 112 executes a service for B and returns the SIP Invite to the S-CSCF (B) 119.

Step 4 As the B-party is using GSM access, her IFC includes an indication that the SIP Invite shall be routed through SIP-AS (route) 120. That SIP-AS 112 is an AS for the purpose of providing routing information for delivering a call to the B-party in the GSM network. Routing the SIP Invite to SIP-AS (route) 120 is done in accordance with IMS methodology. That means that only IMS subscribers that use GSM access have IFC with setting to route to the SIP-AS (route) 120.

Step 5 SIP-AS (route) 120 returns the SIP Invite to the S-CSCF (B) 119. This SIP-AS returns the SIP Invite to the S-CSCF, with the following information in the to:field:
TEL URL: this is the MSISDN of the B-subscriber;
Prefix: the prefix is a designated number (or digit string) that indicates that the call shall be routed directly to the VMSC 107a of the destination subscriber.
The returning of the SIP Invite to S-CSCF (B) 119 is further done in accordance with IMS methodology.

Step 6 S-CSCF (B) 119 must now deliver the call to an ENUM server 121. Hereto, S-CSCF (B) 119 queries ENUM. S-CSCF (B) 119 provides the TEL URL (including the prefix) to ENUM server 121.

Step 7 The prefix in front of the TEL URL indicates to ENUM server 121 that it shall obtain the Mobile Station Roaming Number (MSRN) for this call. Hereto, ENUM server 121 sends MAP Send Routing Information (SRI) to HLR 106. The routing of MAP SRI to HLR 106 is done in accordance with GSM methodology.

Step 8 HLR 106 sends MAP Provide Roaming Number (PRN) to the MSC 107 where the destination subscriber is registered, to obtain an MSRN. The routing of MAP PRN to MSC 107 is done in accordance with GSM methodology.

Step 9 The MSC 107 returns an MSRN in MAP PRN-Res to HLR 106.

Step 10 The HLR 106 forwards the MSRN in MAP SRI-Res to ENUM server 121.

Step 11 The MSRN has E.164 format. ENUM server 121 converts the MSRN to a domain. Converting E.164 numbers into a domain is normal functionality of ENUM. When MSRN is converted to a domain, the result will be N.R.S.M.e164.arpa. The notation "N.R.S.M." reflects that the digits of the MSRN are placed in reversed order.

Step 12 S-CSCF (B) 119 uses N.R.S.M.e164.arpa to query DNS 122. The MSC 107 where the B-party is registered has integrated MGCF. This implies that the MSC 107 may receive SIP Signaling for Network-to-Network Interface (NNI) purposes. The IP Address needed to send SIP Signaling to that MSC 107 is configured in DNS 122. The MSRN range associated with that MSC 107 is configured in DNS 122 and has the IP address for that MSC 107 associated with it.

Step 13 122 returns the IP address for this MSC 107.

Step 14 S-CSCF (B) 119 sends the SIP Invite to the VMSC/MGCF 107a.

Step 15 VMSC/MGCF 107 receives SIP Invite destined for a particular TEL URL. The MGCF 107 applies SIP to ISUP conversion, after which the call continues internally in the MSC/MGCF 107 via ISUP signaling. The internal ISUP IAM contains a Called Party Number that is the MSRN that was allocated earlier. The MSC 107 will start terminating call handling process to deliver the call to the destination subscriber, using the MSRN. The MSC 107 sends DTAP Setup to the destination subscriber.

Further call handling, after the MS-B has received DTAP Setup, follows GSM and IMS principles.

ENUM server 121 will act as normal, in the case that it does not manage to obtain an MSRN. That implies that it returns the E.164 number (B-party's MSISDN) as domain. I.e. ENUM server 121 returns N.D.S.I.S.M.e164.arpa. The notation "N.D.S.I.S.M." reflects that the digits of the MSISDN are placed in reversed order. The S-CSCF (B) 119 would perform DNS query, based on the received N.D.S.I.S.M.e164.arpa. DNS 122 would (probably) return "unknown" upon which S-CSCF takes a default breakout route to a BGCF and MGCF. The call is now routed to the B-party through a GMSC 105, as per normal terminating GSM call handling.

In another case wherein the VMSC 107a does not have an MGCF, then the DNS 122 will return "unknown" when it receives the DNS query based on the N.R.S.M.e164.arpa. The S-CSCF (B) 119 takes a default breakout route a BGCF and MGCF. The call is now routed through ISUP network to the VMSC 107a of the B-party.

When the SIP-AS 112 has received the MSRN, it may route the call to the destination MSC 107. The SIP-AS 112 sends a SIP INVITE to the S-CSCF from which the VPN 104 service was triggered (in the case of user-initiated call establishment) or to a designated S-CSCF (in the case of service-initiated call). The S-CSCF uses existing methodology to query the Domain Name Server (DNS) 122 in order to obtain an IP Address for forwarding the SIP INVITE. Two scenarios may occur.

Figure 8:
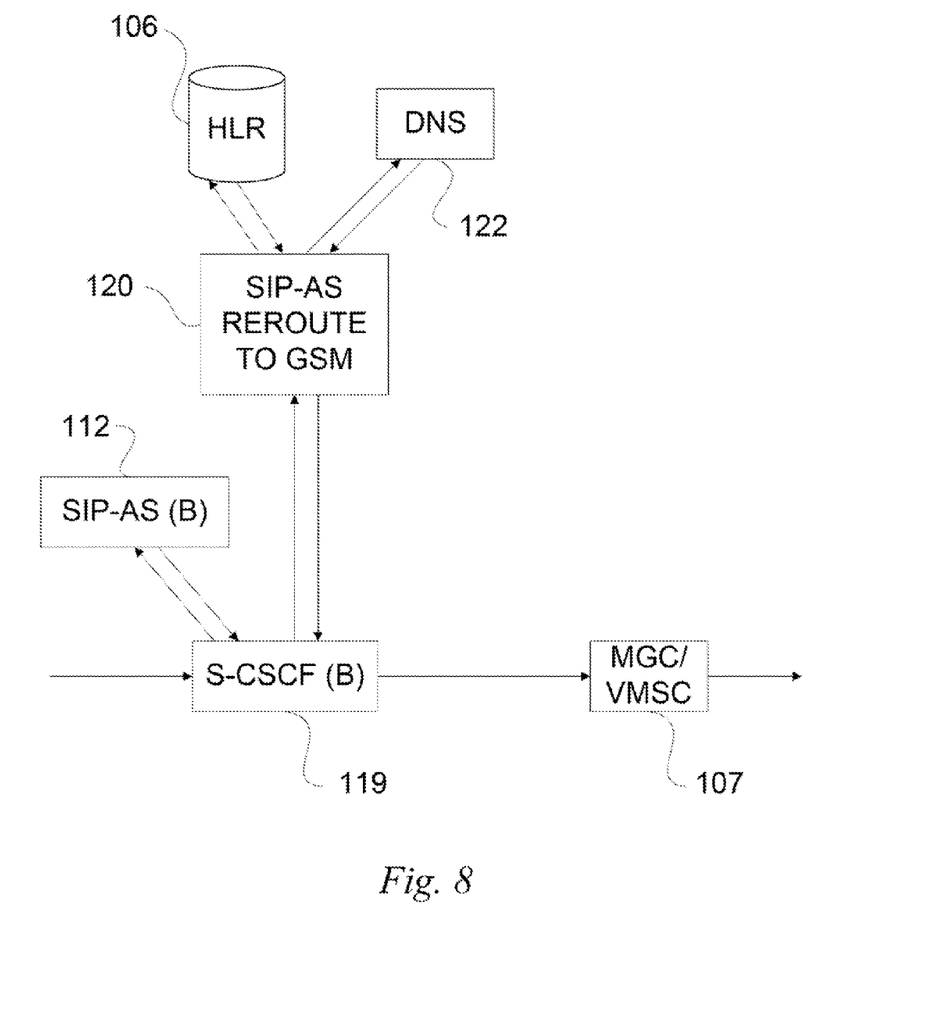
FIG. 8 is a diagram showing a role of an SIP-AS (route) 120.

FIG. 8 shows an embodiment of a first scenario, wherein a SIP-AS (route) 120 takes responsibility for obtaining MSRN from HLR 106 and for obtaining IP address from DNS 122. In that way, no ENUM is used.

The MSRN was allocated by an MSC that has an integrated MGCF. Such MSC can receive SIP signaling. That MSC 107 is defined in DNS 122, hence DNS 122 returns the IP Address of this MSC 107. The S-CSCF sends the SIP INVITE to that IP Address. The SIP INVITE ends up in the destination MSC 107 and the call is offered to the destination subscriber. The MSC 107 will convert between SIP signaling and ISUP hereto. The media stream is routed over IP directly between calling subscriber and the combined CS-MGW and IMS-MGW 118 connected to the destination MSC 107. S-CSCF (B) 119 invokes IMS-services for B-party. After "normal" service execution, the latest SIP-AS 112 ("locate service") re-routes to the GSM-phone. The SIP-AS 112:
- determines the "location" of the user, i.e. the 06-xxx number
- translates (using HLR 106) the 06-xxx number into the MSRN number
- determines address of the MGCF/VMSC 107a node where the call must be routed to In a second scenario (not shown in a figure), the MSRN was allocated by an MSC 107 that does not have an integrated MGCF. In that case, the MSC 107 is not known in DNS 122 and the DNS 122 does not return an IP Address. As a result, S-CSCF forwards the SIP INVITE, via a BGCF, to an MGCF in the operator's own IMS network. The MGCF converts the SIP INVITE to ISUP IAM and the call is then forwarded to the destination VMSC 107*a*. In this scenario, the routing of the call to the VMSC 107*a* is based on SS7 signaling.

The media stream is conveyed through existing GSM CS methods, such as TDM. In this second scenario, the MSRN is still used for call routing, but the call is routed through SS7 instead of through IMS. That means that the mechanism whereby the SIP-AS 112 obtains the MSRN from the HLR 106 may also be used when the Mobile Station (110) is roaming in a network which' MSCs don't have an integrated MGCF. It is noted that the SIP-AS 112 does not know where the destination subscriber is roaming. The SIP-AS 112 does not need knowledge about which MSCs support SIP signaling. The response from DNS 122 takes care of sending the SIP INVITE directly to the VMSC 107*a* or routing the call via the BGCF in the operator's own network.

Figure 9:
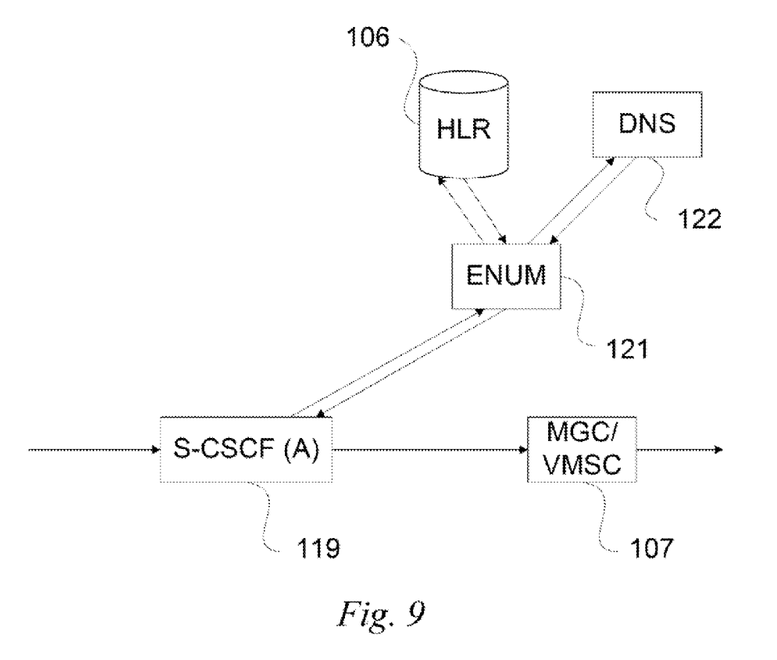
FIG. 9 is a diagram showing a role of an SIP-AS (route) 120 acting on behalf of an A-party.

FIG. 9 shows an embodiment wherein a SIP-AS 112 that is acting on behalf of the A-party performs the tasks of obtaining the MSRN and obtaining the IP address. This method may be applied for on-net calls, whereby a SIP-AS 112 of the A-party may execute services for a B-party belonging to the same VPN group.

The SIP-AS 112 may include the "suppress T-CSI" flag in MAP SRI. Including this parameter in MAP SRI has the effect that the HLR 106 does not return the T-CSI for this subscriber. A subscriber may have T-CSI in the HLR 106; T-CSI is used for terminating IN Services for that subscriber. The T-CSI in HLR 106 may be used to route Mobile Terminating calls for that subscriber, to the IMS network. The GSM network is in that case used primarily for mobile access. Service control resides in IMS.

If, in such scenario, the SIP-AS 112 needs to deliver a call to a destination subscriber, then the T-CSI needs to be suppressed. Otherwise, the call to that subscriber would be routed to IMS again! Hence, the use of MAP SRI including Suppress T-CSI between the SIP-AS 112 and the HLR 106, resolves that dilemma.

The invention claimed is:

1. A method in a telecommunication network for routing, by a service control node, a media stream from an IP Multimedia Subsystem (IMS) domain to a Mobile Switching Centre (MSC) associated with a mobile station in a circuit switched domain of a public land mobile network (PLMN), wherein the mobile station is identified by a logical address, the method comprising the steps of:
said service control node sending a first request for a physical address associated with said mobile station to a Home Location Register (HLR) associated with said PLMN;
said HLR sending a second request for said physical address to said MSC;
said MSC sending said physical address to said HLR;
said HLR sending said physical address to said service control node;
said service control node sending said physical address to a traffic control node in said IMS domain;
said traffic control node sending a request for routing path data associated with said physical address to a routing server;
said routing server sending said routing path data to said traffic control entity;
said traffic control node using said routing path data for routing said media stream to said MSC,
wherein the routing path data at the step of sending said routing path data to said traffic control entity by the routing server, is obtained from a range of the physical addresses associated with the MSC, the association of the routing path data and the range of addresses configured in the routing server, wherein the routing server sends the routing path data for that MSC associated with the range.

2. The method according to claim 1, wherein said service control node includes in said first request a service suppression indicator such as a suppress Terminating - Customized Applications for Mobile network Enhanced Logic (CAMEL) Subscription Information.

3. The method according to claim 1, wherein said first request comprises a Mobile Application Part (MAP) Send Routing Information message.

4. The method according to claim 1, wherein said second request comprises a Mobile Application Part Provide Roaming Number message.

5. The method according to claim 1, wherein said service control node is a node of the group including:
a Session Initiation Protocol Application Server;
a telephone number mapping server such as an Telephone Number Mapping (ENUM) server; and
a Client Gateway.

6. The method according to claim 1, wherein said traffic control node comprises a Serving Call Session Control Function.

7. The method according to claim 1, wherein said service control node and said traffic control node are integrated in a client gateway.

8. The method according to claim 1, wherein said routing server comprises a Domain Name Server.

9. The method according to claim 1, wherein said logical address is a logical address of the group including:
a Mobile Station Integrated Services Digital Network (ISDN) number;
a Telephone (TEL) Uniform Resource Locator (URL); and
a Session Initiation Protocol (SIP) Uniform Resource Identifier (URI).

10. The method according to claim 1, wherein said physical address is a Mobile Station Roaming Number.

11. The method according to claim 1, wherein said routing path data comprises an Internet Protocol (IP) address of said MSC.

12. The method according to claim 1, said routing server sending said routing path data after obtaining said routing path data from internal data structure such as internal Domain Name Server (DNS) data provisioning.

13. The method according to claim 1, wherein said MSC comprises a Visited MSC.

14. The method according to claim 1, wherein said MSC comprises an MSC server and a combination of a Media Gateway Control Function and a Signaling Gateway.

15. The method according to claim 1, wherein said media stream is routed through an Internet Protocol (IP) connection using an Internet Protocol standard such as a Real time Transport Protocol.

16. The method according to claim 1, wherein said media stream comprises voice, video or data.

17. A Serving-Call Session Control Function (S-CSCF) in a telecommunication network arranged for routing, by a service control node, a media stream from an IP Multimedia Subsystem (IMS) domain to a Mobile Switching Centre (MSC) associated with a mobile station in a circuit switched domain of a public land mobile network (PLMN), wherein the mobile station is identified by a logical address, wherein the S-CSCF is arranged for sending a logical address of said mobile station to a service control node, and the S-CSCF is further arranged for routing said multimedia stream to said MSC at said physical address by:

said service control node sending a first request for a physical address associated with said mobile station to a Home Location Register (HLR) associated with said PLMN;

an associated HLR sending a second request for said physical address to said MSC said MSC sending said physical address to said HLR;

said HLR sending said physical address to said service control node;

said service control node sending said physical address to a traffic control node in said IMS domain;

said traffic control node sending a request for routing path data associated with said physical address to a routing server;

said routing server sending said routing path data to said traffic control entity; and said traffic control node using said routing path data for routing said media stream to said MSC. the routing path data being obtained from a range of the physical addresses associated with the MSC, the association of the routing path data and the range of addresses configured in the routing server wherein the routing server sends the routing path data for the MSC associated with the range.

18. A routing server comprised by a telecommunication network, the network arranged for routing a media stream from an Internet Protocol (IP) Multimedia Subsystem (IMS) domain to a Mobile Switching Centre (MSC) associated with a mobile station in a circuit switched domain of a public land mobile network (PLMN), wherein the routing server is arranged for returning routing path data associated with the MSC on a query that provides a physical address, characterized in that a range of the physical addresses associated with the MSC is configured in the routing server and that the routing server is arranged to return the routing path data for that MSC associated with the range to a traffic control entity performing the query.

19. The routing server according to claim 18 wherein the physical address is a Mobile Station Roaming number (MSRN) and the routing path data is an Internet Protocol (IP) address.

* * * * *

UNITED STATES PATENT AND TRADEMARK OFFICE
CERTIFICATE OF CORRECTION

| | |
|---|---|
| PATENT NO. | : 7,881,288 B2 |
| APPLICATION NO. | : 12/161708 |
| DATED | : February 1, 2011 |
| INVENTOR(S) | : Noldus et al. |

It is certified that error appears in the above-identified patent and that said Letters Patent is hereby corrected as shown below:

In Fig. 7, Sheet 8 of 10, delete "  " and insert --  --, therefor.

In Fig. 7, Sheet 8 of 10, delete "  " and insert --  --, therefor.

In Fig. 7, Sheet 8 of 10, delete "  " and insert --  --, therefor.

In Column 3, Line 12, delete "Brach" and insert -- Branch --, therefor.

In Column 3, Lines 27-28, after "The" insert -- Bearer Independent Call...... (TDM) respectively" as a continuation of the sentence.

In Column 6, Line 55, delete "B-party" and insert -- B-party. --, therefor.

In Column 8, Line 42, delete "B-party" and insert -- B-party. --, therefor.

In Column 8, Line 45, delete "GSM-phone" and insert -- GSM-phone. --, therefor.

In Column 8, Line 47, delete "MSRN" and insert -- MSRN. --, therefor.

In Column 8, Line 67, delete "13" and insert -- 13. --, therefor.

Signed and Sealed this
Twenty-fifth Day of October, 2011

David J. Kappos
*Director of the United States Patent and Trademark Office*

CERTIFICATE OF CORRECTION (continued)
U.S. Pat. No. 7,881,288 B2

In Column 10, Line 56, delete "determines" and insert -- -determines --, therefor.

In Column 10, Lines 58, delete "translates" and insert -- -translates --, therefor.

In Column 10, Lines 60, "determines" and insert -- -determines --, therefor.

In Column 11, Line 44, in Claim 1, delete "public land mobile network" and insert -- Public Land Mobile Network --, therefor.

In Column 12, Line 20, in Claim 5, delete "an Telephone" and insert -- a Telephone --, therefor.

In Column 12, Line 64, in Claim 17, delete "public land mobile network" and insert -- Public Land Mobile Network --, therefor.

In Column 13, Line 21, in Claim 17, delete "MSC." and insert -- MSC, --, therefor.

In Column 14, Lines 9-10, in Claim 18, delete "public land mobile network" and insert -- Public Land Mobile Network --, therefor.

In Column 14, Line 19, in Claim 19, delete "claim 18" and insert -- claim 18, --, therefor.